June 16, 1925.
T. M. JOYNER
TRANSMISSION GEARING
Filed Jan. 12, 1922
1,542,701
3 Sheets-Sheet 1
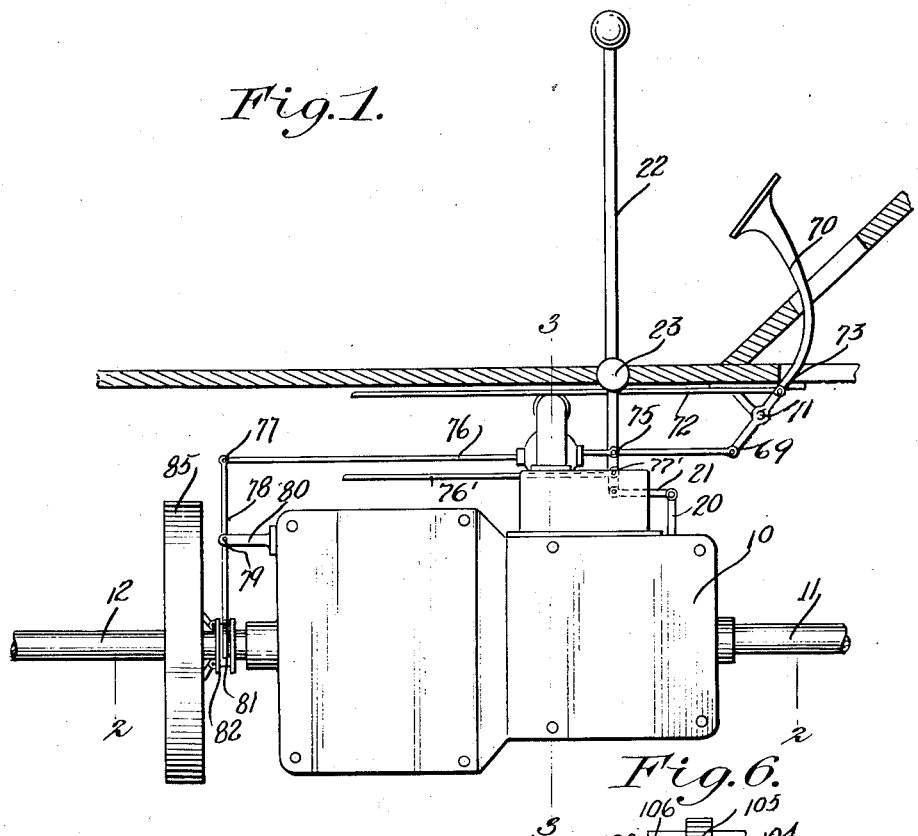
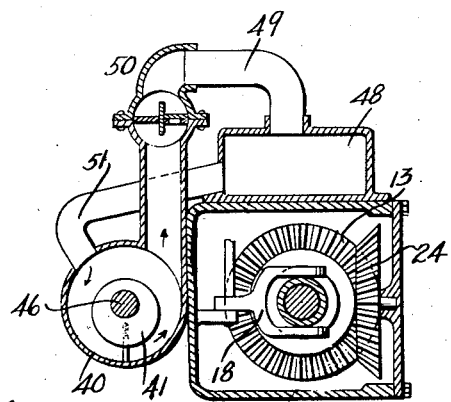
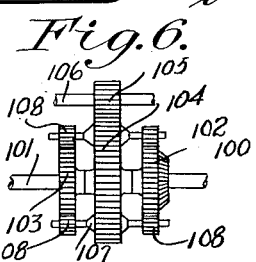
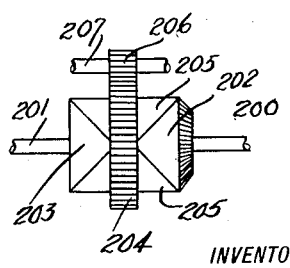
WITNESSES
Fred W. Ely
P. H. Pattison
INVENTOR
Taylor M. Joyner
BY
ATTORNEYS

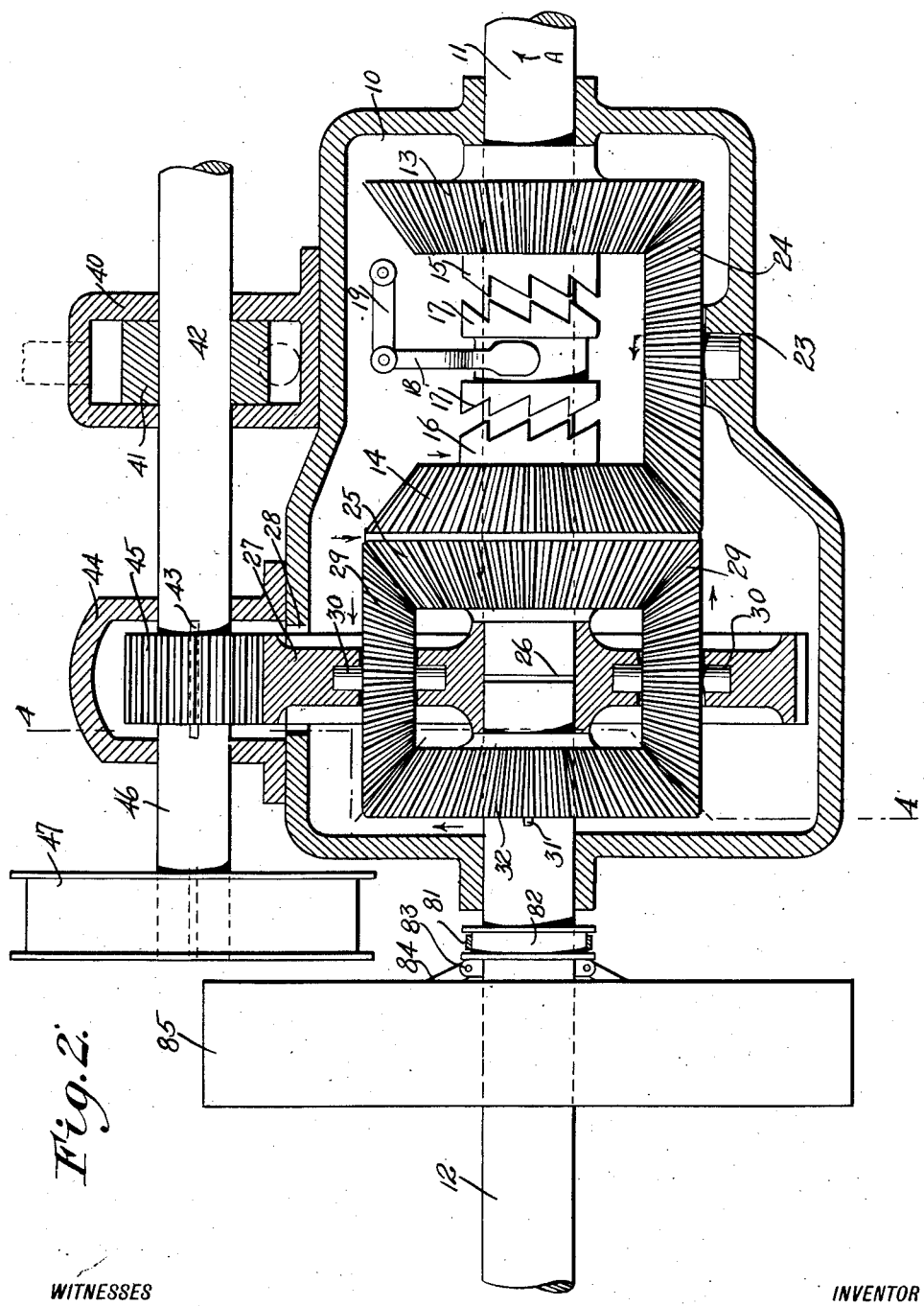

June 16, 1925.  1,542,701
T. M. JOYNER
TRANSMISSION GEARING
Filed Jan. 12, 1922   3 Sheets-Sheet 3

WITNESSES

INVENTOR
Taylor M. Joyner.
BY
ATTORNEYS

Patented June 16, 1925.

1,542,701

UNITED STATES PATENT OFFICE.

TAYLOR M. JOYNER, OF ST. CLOUD, MINNESOTA.

TRANSMISSION GEARING.

Application filed January 12, 1922. Serial No. 528,782.

*To all whom it may concern:*

Be it known that I, TAYLOR M. JOYNER, a citizen of the United States, and a resident of St. Cloud, in county of Stearns and State of Minnesota, have invented a new and Improved Transmission Gearing, of which the following is a full, clear, and exact description.

The present invention relates to new and useful improvements in gearing, and it pertains more particularly to a new and improved form of transmission gearing.

It is one of the primary objects of the invention to provide a transmission gearing particularly adapted for motor vehicles and in which the shifting of gears such as employed in the ordinary type of transmission is eliminated.

It is a further object of the invention to provide a new and improved form of transmission in which the gears at all times run in mesh with one another.

It is a still further object of the invention to provide a transmission mechanism in which a throttling action produces the increase and decrease in speed of the vehicle to which the transmission is attached.

With the above and other objects in view, reference is had to the accompanying drawings, in which Figure 1 is a view in elevation showing the transmission mechanism and its position relative to a motor vehicle, the floor boards of the motor vehicle being shown in section for the sake of illustration;

Fig. 2 is a vertical sectional view of the transmission mechanism constructed in accordance with the present invention taken on the line 2—2 of Fig. 1;

Fig. 3 is a vertical sectional view thereof taken at right angles to Fig. 2 and on the line 3—3 of Fig. 1;

Fig. 6 is a detail plan view of a modified form of the invention;

Fig. 7 is a plan view of a still further modified form of the invention.

Figure 4:
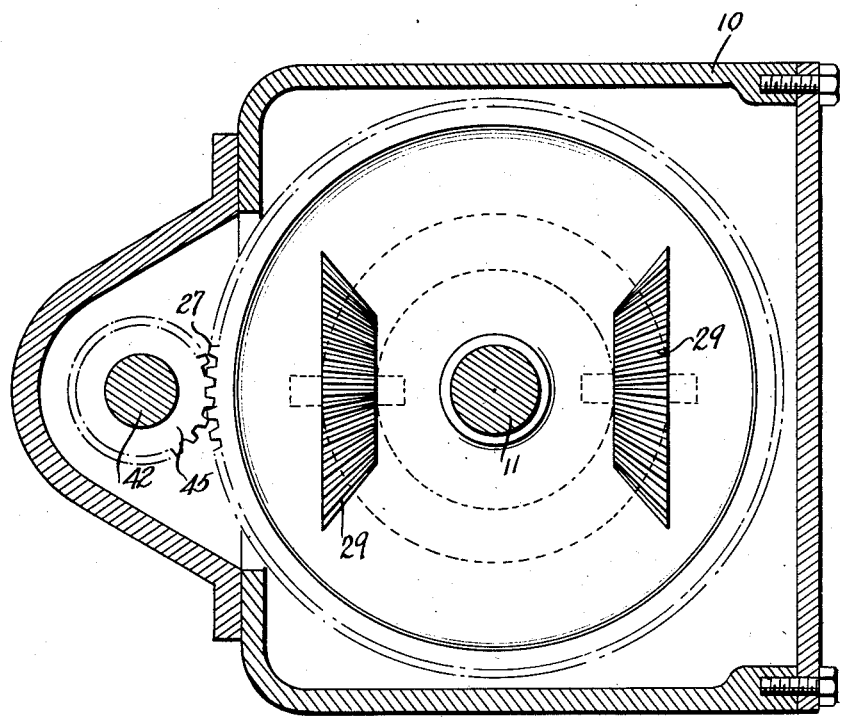
Fig. 4 is a vertical sectional view taken on the line 4—4 of Fig. 2.

Referring more particularly to the drawings, the transmission comprises a housing 10 and leading into one end of said housing is a driving shaft 11, and leading from the other end thereof is a driven shaft 12. Mounted upon the driving shaft 11 and within the housing 10, are two opposed bevel gears 13 and 14. These gears are provided with clutch faces 15 and 16, respectively, and mounted upon the driving shaft 11, between the clutch faces 15 and 16, is a double clutch member having faces 17 and 17'. This double clutch member is keyed to its shaft and operated by a fork 18 connected to a rocking arm 19, and said rocking arm 19 is operated by means of a vertically extending lever 20 connected by means of a link 21 to a hand lever 22 universally mounted as at 23, said lever extending upwardly into the vehicle body to a position adjacent the operator's seat. Mounted in the side wall of the housing 10 of the transmission, as at 23, is a bevel gear 24, and said bevel gear 24 meshes with the bevel gears 13 and 14 heretofore mentioned.

The bevel gear 14 is formed with an opposed set of bevel teeth 25, as more clearly shown in Fig. 2, and said last-mentioned bevel teeth 25 are opposed, as stated, with respect to the bevel of the gear 14.

The shafts 11 and 12 are so arranged that their inner ends are adjacent as indicated by the reference character 26, and mounted upon these adjacent ends of the shafts 11 and 12, is a gear 27, which gear extends through the upper wall of the housing as indicated by the reference character 28. This gear 27 carries a plurality of idle gears 29, each of which is mounted as at 30 thereon, and said gears 29 are adapted to mesh with the bevel teeth 25 of the bevel gear 13. The gears 13, 14 and 27 are loosely mounted upon their respective shafts, and keyed as at 31 to the driven shaft 12 is a bevel gear 32, which bevel gear meshes with the gears 29 as more clearly shown in Fig. 2.

Mounted upon one of the side walls of the housing 10, is a pump housing 40, and mounted within this pump housing 40, is a pump 41. This pump 41 is carried by a shaft 42, and keyed to said shaft 42 as at 43 and operating within the housing 44, is a gear 45, which gear 45 meshes with the gear 27 heretofore mentioned. The shaft 42 is extended beyond the housing 44 as indicated by the reference character 46, and mounted upon the free end thereof, is a pulley or drum 47, the purpose of which will be hereinafter more specifically described. The pump mechanism is shown more clearly in Fig. 3, and in said figure the pump housing 40 communicates with a chamber 48, by means of a passageway 49 within which is mounted a plurality of sliding valves 50. Leading back from the chamber 48 to the pump housing 40, is a return passage 51. By this construction, it is apparent that upon operation of the pump 41, fluid which is contained within the chamber 48 will be caused to circulate through the valve 50 and passage 49 to the chamber 48, from whence it is free to return to the pump 41 by way of the passage 51, assuming, of course, that the valves 50 are open to permit of the free passage of fluid therethrough.

Figure 5:
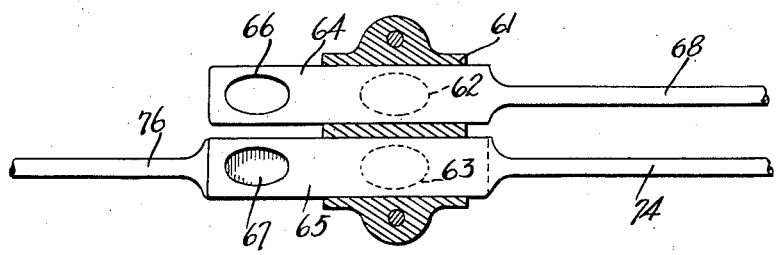
Fig. 5 is a detail view partly in section of the controlling valves.

As more clearly shown in Fig. 5, the valve mechanism comprises a partition member 61, in which is provided a plurality of openings 62 and 63, shown in dotted lines in said figure. Slidably mounted in the partition member 61 are two valve members 64 and 65, and these valve members 64 and 65 are provided with valve openings 66 and 67, respectively. The valve member 64 is provided with an extended portion 68, and said extended portion 68 is connected as indicated by the reference character 69, to the lower end of a foot brake lever 70, which latter is pivotally mounted as at 71 and to which the brake rod 72 is connected as at 73. By this construction it is apparent that as the foot brake lever 70 is rocked about its pivotal point 71, the valve member 64 will be reciprocated in the partition member 61 for a purpose to be hereinafter more specifically described.

The valve member 65 has an extension 74 and said extension 74 is pivotally connected as at 75 near the lower end of the hand lever 22 heretofore mentioned. This valve member 65 is also provided with a rearwardly-extending portion 76, and said rearwardly-extending portion 76 is pivotally connected as at 77 to the upper end of a vertically disposed lever 78, which latter is pivotally mounted as at 79 in a bracket 80. The lower end of this lever 78 is forked as at 81, and operates in a collar 82. This collar 82 is pivotally connected as at 83 to levers 84 of a centrifugal governor 85, and said collar 82 is slidably mounted upon the driven shaft 12 in order that as the governor actuates, the collar will be moved longitudinally of the shaft to operate the valve member 65 in a manner to be hereinafter more specifically described.

The reference character 76' designates the hand brake connection of the vehicle which is pivotally connected as at 77' to the hand lever 22 in such a manner that as the hand brake is operated, the valve mechanism will be operated in the same manner as is the case when the foot brake is operated.

The operation of the device is as follows:
Assuming that the several parts are in the position shown in Fig. 2, (except that the clutch member 17 is engaged with the clutch member 15), with the driving shaft 11 rotating in the direction of the arrow A. This rotation of the shaft 11 drives the gear 13, and through the medium of the gear 24, the gear 14 will be driven. As the gear 14 is driven, the idle gears 29 will likewise be driven and will travel around the gear 32, said gear 32 acting as a stationary rack. As the idle gears travel around the gear 32, a rotation of the gear 27 is had. This rotation of the gear 27 drives the gear 45 and operates the pump 41 through the medium of the shaft 42, it being understood that one of the valves 66 or 67 is in register with its opening 62 or 63, respectively, to permit of the free passage of the fluid from the pump to the chamber 48 by way of the passage 49.

Assuming now that the passage of the fluid from the pump 41 to the chamber 48 is impeded by a partial closing of one of the valves, it is apparent that the resistance offered to the pump will be transmitted through the shaft 42 and the gear 45 to the gear 27, and this resistance serves to retard the rotation of the gear 27 and transmit a portion of the power to the gear 32 carried by the driven shaft 12. As this resistance is increased, it will be noted that a greater amount of power will be transmitted to the driven shaft 12, the amount of power transmitted to the driven shaft 12 being proportionate with the amount of resistance offered to the passage of fluid from the pump 41 to the chamber 48.

When it is desired to reverse the direction of movement of the driven shaft 12, the clutch face 17 is disengaged from the clutch face 15, and the clutch face 17' is engaged with the clutch face 16. This locks the gear 14 to the driving shaft 11 and said gear is then driven in the same direction as the shaft 11. This double clutch member 17, 17' is operated as heretofore stated by means of the hand lever 22.

To provide for operation of the valve members 64 and 65, the valve member 64 is connected to the brake pedal and is operated thereby while the valve member 65 is operated by the hand lever 22 or the governor 85, as the case may be. By connecting the valve member 64 to the foot brake. it is apparent that at the time the foot brake is applied, the valve opening 66 in the valve member 64 is moved into registration in its opening 62 in the partition 61, and thus removes the resistance offered to the fluid moved by the pump and automatically cuts off the power delivered to the driven shaft 12.

The valve member 65 controlled by the governor 85 is so constructed as to provide for automatic operation of the valve member 65, even though the same may be set by means of the hand lever 22 to such a position where it will be only partially open, and, therefore, would permit of only a fraction of the power of the driving shaft being transmitted to the driven shaft, and said governor will serve to operate the valve and move the same to a position where the full amount of power from the driving shaft may be transmitted to the driven shaft as the vehicle accelerates. The drum 47 secured to the shaft 46 and heretofore mentioned is adapted to receive a friction band, which friction band would be preferably manually controlled and employed in case of accident to the pump to supply the necessary resistance to the gear 27, which could not be otherwise obtained if the pump were to become inactive.

From the foregoing it is apparent that the present invention provides a new and improved form of transmission in which the several gears are at all times in mesh one with another, and that in order to obtain the power necessary to propel the vehicle, it is only necessary to lock certain of the gears to their respective shafts dependent upon the direction of drive desired. Furthermore, by a construction of this character, it is obvious that the acceleration of speed of a vehicle equipped with a transmission of this type will be gradual and not intermittent and jerky as is common in transmissions as ordinarily constructed. Furthermore, with such a construction, the acceleration may be automatically controlled by means of a governor in a transmission of this character, if desired.

In Fig. 6 of the drawings, is shown a modified form of the invention in which the gears instead of being bevel are of the type known as "straight tooth," and in this form the driving shaft is designated by the reference character 100 and the driven shaft by the reference character 101. Loosely mounted upon the driving shaft 100, is a gear 102, and keyed to the driven shaft 101 is a gear 103. Interposed between these two gears and loosely mounted upon the driving shaft 100, is a gear 104, and said gear 104 meshes with a gear 105, carried by a pump shaft 106. Mounted in the gear 104, is a plurality of shafts 107, and mounted upon the ends of the shafts 107 are gears 108, which mesh with gears 102 and 103.

In Fig. 7 is shown a still further modified form of the invention, and in this form of the invention the reference character 200 designates the driving shaft and 201 represents the driven shaft. Loosely mounted on the driving shaft 200, is a cone gear 202, and carried by the driven shaft 201, is a cone gear 203. The reference character 204 designates the intermediate gear, and said intermediate gear carries a plurality of cone gears 205 and 205. The gear 204 likewise meshes with a gear 206 mounted upon the pump shaft 207.

In the modified form of the invention shown in Figs. 6 and 7, the operation of the mechanism is the same as that described in the preferred form of the invention.

I claim:

1. A change speed gearing comprising a housing, a pair of alined shafts, an idling gear, a plurality of gears loosely mounted on one of said shafts and manually operated means for connecting the idle gear with either of the loosely mounted gears, a gear keyed to the other of said shafts, a gear interposed between said loosely mounted gears and said keyed gear, means carried by said interposed gear for connecting the loosely mounted gears with the keyed gear, fluid actuating means for retarding the action of the interposed gear to establish driving connection between the loosely mounted gears and the keyed gear, said manual means adapted to control said fluid retarding means.

2. A change speed gearing comprising a casing, a pair of shafts journaled in said casing, said shafts being in alinement one with the other, a plurality of gears loosely mounted on one of said shafts, a gear carried by the casing and interposed with respect to said loosely mounted gears whereby said loosely mounted gears operate in opposite directions such means reversing the rotation of the gears, a gear keyed to the other of said shafts, a gear interposed with respect to the loosely mounted gears and the keyed gear, said interposed gear being idle, means carried by the idle gear to establish communication between the loosely mounted gears and the keyed gear, a brake pedal, fluid retarding means controlled by the brake pedal for controlling the rotation of the idle gear, and means for selectively connecting the loosely mounted gears with their shaft, substantially as described.

3. A change speed gearing comprising a casing, a pair of shafts journaled in said casing, said shafts being in alinement with one another, a plurality of gears loosely mounted on one of said shafts, a gear carried by the casing and interposed with respect to said loosely mounted gears whereby said loosely mounted gears operate in opposite directions, clutch means for causing reverse rotation of said gears, a gear keyed to the other of said shafts, a gear interposed with respect to the loosely mounted gears and the keyed gear, said interposed gear being idle, means carried by the idle gear to establish communication between the loosely mounted gears and the keyed gear, means for selectively connecting the loosely-mounted gears with their shaft, means for retarding the action of the interposed idle gear to establish a driving connection between the loosely mounted gears and the keyed gear, means for controlling the retarding means, said means being connected with the clutch means for simultaneous operation.

4. A change speed gearing comprising a housing, a pair of alined shafts, an idling gear, a plurality of gears loosely mounted on one of said shafts, and manually operated means for connecting the idle gear with either of the loosely mounted gears, a gear keyed to the other of said shafts, a gear interposed between said loosely mounted gears and said keyed gear, means carried by said interposed gear for connecting the loosely mounted gears with the keyed gear, fluid actuating means for retarding the action of the interposed gear to establish driving connection between the loosely mounted gears and the keyed gear, said manual means adapted to control said fluid retarding means, and automatic means for controlling said fluid retarding means independent of the manual means.

5. A change speed gearing comprising a housing, a pair of alined shafts, an idling gear, a plurality of gears loosely mounted on one of said shafts, and manually operated means for connecting the idling gear with either of the loosely mounted gears, a gear keyed to the other shaft, a gear interposed between said loosely mounted gear and said keyed gear, means carried by said interposed gear for connecting the loosely mounted gear with the keyed gear, means for retarding the action of the interposed gear to establish driving connections between the loosely mounted gear and the keyed gear, said manual means adapted to control said retarding means, and automatic means for controlling said retarding means independently of the manual means.

6. A change speed gear comprising a housing, a pair of alined shafts, an idling gear, a plurality of gears loosely mounted on one of said shafts, manually operated means for connecting the idling gear with either of the loosely mounted gears, a gear keyed to the other of said shafts, a gear interposed between said loosely mounted gear and the keyed gear, means carried by said interposed gear for connecting the loosely mounted gears with the keyed gear, means for retarding the action of the interposed gear to establish a driving connection between the loosely mounted gears and the keyed gear, said manual means adapted to control said retarding means.

TAYLOR M. JOYNER.